United States Patent
Osakabe et al.

(10) Patent No.: US 9,479,660 B2
(45) Date of Patent: Oct. 25, 2016

(54) IMAGE RECORDING APPARATUS

(71) Applicant: Brother Kogyo Kabushiki Kaisha, Nagoya-shi, Aichi-ken (JP)

(72) Inventors: Yoshinori Osakabe, Seto (JP); Yuta Uchino, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/716,473

(22) Filed: Dec. 17, 2012

(65) Prior Publication Data

US 2013/0107304 A1 May 2, 2013

Related U.S. Application Data

(63) Continuation-in-part of application No. 12/853,683, filed on Aug. 10, 2010, now Pat. No. 9,126,779.

(30) Foreign Application Priority Data

Aug. 27, 2009 (JP) .................................. 2009-196974

(51) Int. Cl.
*B65H 1/00* (2006.01)
*H04N 1/00* (2006.01)
(Continued)

(52) U.S. Cl.
CPC ........ *H04N 1/00567* (2013.01); *B65H 3/0684* (2013.01); *B65H 5/26* (2013.01);
(Continued)

(58) Field of Classification Search
CPC ........ B65H 1/04; B65H 1/027; B65H 1/266; B65H 2405/31; B65H 2405/32; B65H 2405/35; B65H 2405/361; B65H 2405/00; B65H 1/00; B65H 2405/324; B65H 2405/354; B65H 2407/21; B65H 2553/44; B65H 3/0607; B65H 3/0661; B65H 5/26
USPC ........ 399/107, 110, 124, 125, 392; 271/162, 271/163, 145, 9.09; 347/104
See application file for complete search history.

(56) References Cited

U.S. PATENT DOCUMENTS 4,786,920 A 11/1988 Igarashi
5,411,248 A 5/1995 Yamaguchi
(Continued)

FOREIGN PATENT DOCUMENTS

JP 59-48341 3/1984
JP 2-13542 1/1990
(Continued)

OTHER PUBLICATIONS

Non-final Office Action received in corresponding U.S. Appl. No. 12/853,683 mailed May 7, 2013.
(Continued)

*Primary Examiner* — Thomas Morrison
(74) *Attorney, Agent, or Firm* — Banner & Witcoff, Ltd.

(57) ABSTRACT

An image recording apparatus includes a printing device, an image reading device, two hinge members, and a feed tray. The printing device includes a printing unit configured to record an image on a sheet. The image reading device is disposed above the printing device and includes a scanner configured to read an image recorded on a sheet. The two hinge members are configured to connect the image reading device and the printing device such that the image reading device is pivotable with respect to the printing device. The feed tray, on which a sheet is to be placed, is disposed between the two hinge members. The printing device includes a feeder configured to feed the sheet placed on the feed tray into the printing unit.

11 Claims, 9 Drawing Sheets

(51) Int. Cl.
*B65H 3/06* (2006.01)
*B65H 5/26* (2006.01)
*B65H 9/04* (2006.01)

(52) U.S. Cl.
CPC .......... *B65H 9/04* (2013.01); *B65H 2402/40* (2013.01); *B65H 2402/442* (2013.01); *B65H 2404/6111* (2013.01); *B65H 2405/324* (2013.01); *B65H 2511/12* (2013.01); *B65H 2511/22* (2013.01); *B65H 2801/06* (2013.01)

(56) References Cited

U.S. PATENT DOCUMENTS

| | | | | |
|---|---|---|---|---|
| 5,671,466 | A | * | 9/1997 | Hokamura et al. ............ 399/124 |
| 6,264,386 | B1 | * | 7/2001 | Sugahara ...................... 400/578 |
| 6,267,368 | B1 | | 7/2001 | Tomoe et al. |
| 6,612,561 | B2 | * | 9/2003 | Sekine .......................... 271/3.14 |
| 7,036,813 | B2 | | 5/2006 | Asada |
| 7,188,835 | B2 | * | 3/2007 | Lee et al. ...................... 271/147 |
| 7,356,302 | B2 | | 4/2008 | Yamamoto |
| 7,413,187 | B2 | * | 8/2008 | Mitsuhashi ................... 271/162 |
| 7,510,278 | B2 | * | 3/2009 | Matsui .......................... 347/104 |
| 7,866,655 | B2 | * | 1/2011 | Uehara ......................... 271/9.09 |
| 2002/0114640 | A1 | * | 8/2002 | Nobe et al. ................... 399/110 |
| 2004/0047662 | A1 | | 3/2004 | Ozawa et al. |
| 2007/0002116 | A1 | * | 1/2007 | Budelsky et al. ............ 347/104 |
| 2007/0222136 | A1 | | 9/2007 | Murakami |
| 2008/0093789 | A1 | | 4/2008 | Lee et al. |
| 2009/0136275 | A1 | * | 5/2009 | Yamazaki ..................... 399/367 |
| 2009/0324263 | A1 | * | 12/2009 | Shimizu et al. ................ 399/38 |

FOREIGN PATENT DOCUMENTS

| | | | |
|---|---|---|---|
| JP | 03-172258 A | | 2/1991 |
| JP | 8113379 A | | 5/1996 |
| JP | 10-181941 A | | 7/1998 |
| JP | 2001-268293 | * | 9/2001 |
| JP | 2005-225646 A | | 8/2005 |
| JP | 2005219860 A | | 8/2005 |
| JP | 2005-341393 | * | 12/2005 |
| JP | 2007-031093 A | | 2/2007 |
| JP | 2007261069 A | | 10/2007 |
| JP | 2008-105807 A | | 5/2008 |
| JP | 4-153150 B2 | | 9/2008 |
| JP | 2012-1329 | * | 1/2012 |
| JP | 2012-1330 | * | 1/2012 |

OTHER PUBLICATIONS

Notice of Reasons for Rejection against corresponding Japanese Patent Application No. 2009-196974 mailed Mar. 19, 2013.
Notice of Reasons for Rejection issued in Japanese Patent Application No. 2013-106073 mailed Apr. 1, 2014.
Final Office Action issued in corresponding U.S. Appl. No. 12/853,683 mailed Nov. 14, 2013.
Non-Final Office Action issued in corresponding U.S. Appl. No. 12/853,683 mailed Apr. 11, 2014.
Final Office Action issued in corresponding U.S. Appl. No. 12/853,683 mailed Jul. 6, 2012.
Non-Final Office Action issued in corresponding U.S. Appl. No. 12/853,683 mailed Oct. 11, 2012.
Non-Final Office Action issued in corresponding U.S. Appl. No. 12/853,683 mailed Mar. 28, 2012.
Nov. 21, 2014—(US) Final Office Action—U.S. Appl. No. 12/853,683.
Jan. 15, 2016—(US) Non-Final Office Action—U.S. Appl. No. 14/845,676.

* cited by examiner

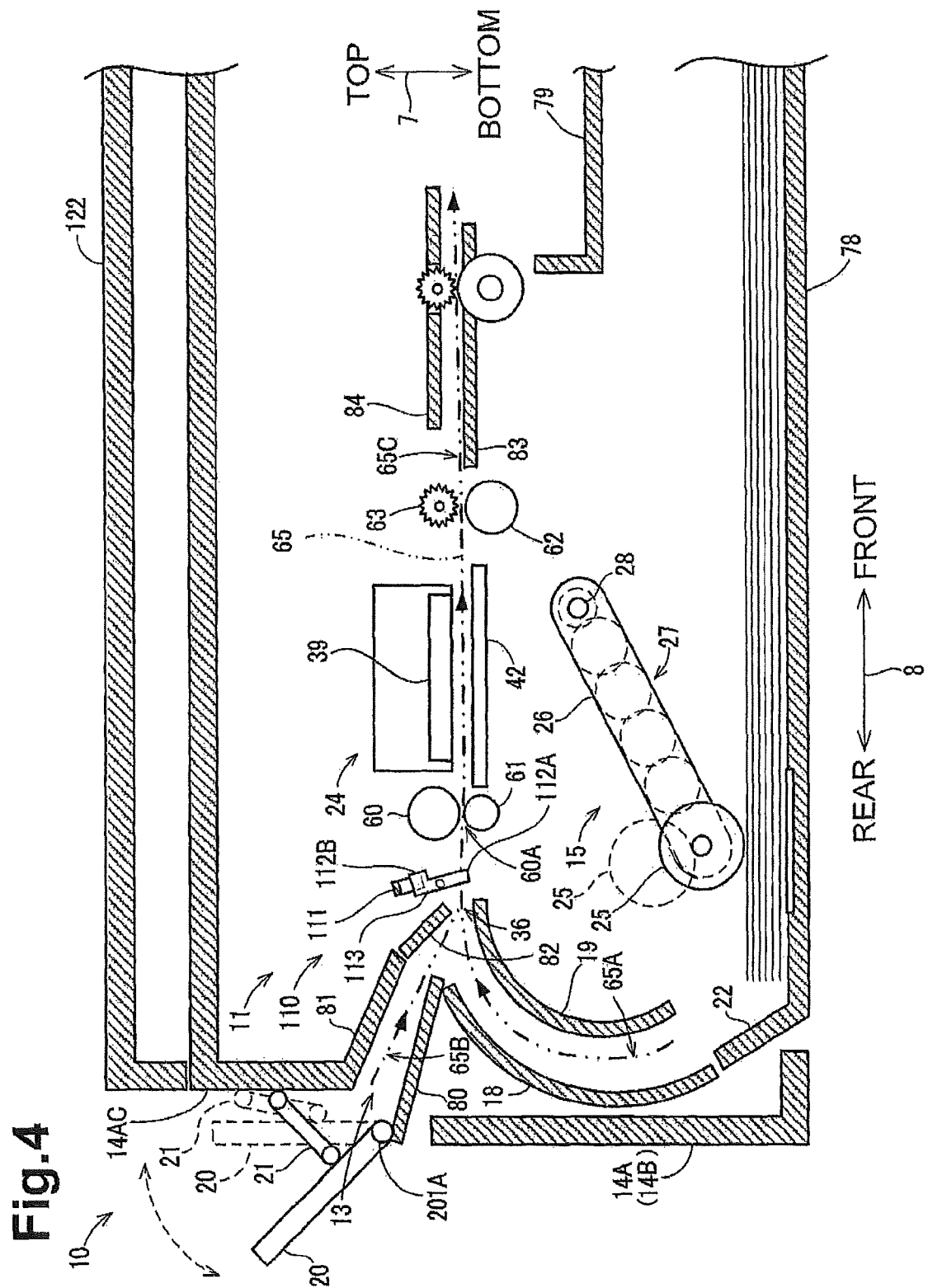

IMAGE RECORDING APPARATUS

CROSS REFERENCE TO RELATED APPLICATIONS

This application is a continuation-in-part of U.S. application Ser. No. 12/853,683 filed on Aug. 10, 2010, which claims priority from Japanese Patent Application No. 2009-196974, which was filed on Aug. 27, 2009, the disclosure of which is incorporated herein by reference in its entirety.

BACKGROUND OF THE INVENTION

1. Field of the Invention

The present invention relates to an image recording apparatus having a manual paper feed tray.

2. Description of the Related Art

Image recording apparatuses having a compact and an openable/closable manual paper feed tray are known. In some image recording apparatuses, the manual paper feed tray may be opened when being used and closed when unused. However, because the height of the manual paper feed tray often exceeds the height of the recording apparatus, a user may be required to place the apparatus in locations that have sufficiently large depths or space Other image recording apparatuses may have a manual paper feed tray that is shorter. However, to accurately set a sheet on the manual paper feed tray located in the rear of the apparatus, the user may need to by visually check an insertion section of the sheet. Accordingly, the user may have difficulties in setting the sheet on the manual paper feed tray when the manual feed paper tray is located in the rear of the image recording apparatus. For example, users may have to lean over the entire length of the image recording apparatus to visually insure correct placement on the tray and insertion into the apparatus.

Accordingly, there is a need for an image recording apparatus that is compact and has an openable/closable manual paper feed tray on which a sheet may be set in an efficient manner.

SUMMARY OF THE INVENTION

An image recording apparatus includes a printing device, an image reading device, two hinge members, and a feed tray. The printing device includes a printing unit configured to record an image on a sheet. The image reading device is disposed above the printing device and includes a scanner configured to read an image recorded on a sheet. The two hinge members are configured to connect the image reading device and the printing device such that the image reading device is pivotable with respect to the printing device. The feed tray, on which a sheet is to be placed, is disposed between the two hinge members. The printing device includes a feeder configured to feed the sheet placed on the feed tray into the printing unit.

BRIEF DESCRIPTION OF THE DRAWINGS

FIG. 4 is a vertical cross-sectional view schematically illustrating an internal configuration of a printer.

DESCRIPTION OF THE PREFERRED EMBODIMENTS

Embodiments of the invention will be hereinafter described with appropriate reference to the accompanying drawings. The embodiments described below are merely examples of the invention, and obviously, the embodiments can be suitably modified without departing from the scope of the invention.

Figure 1:
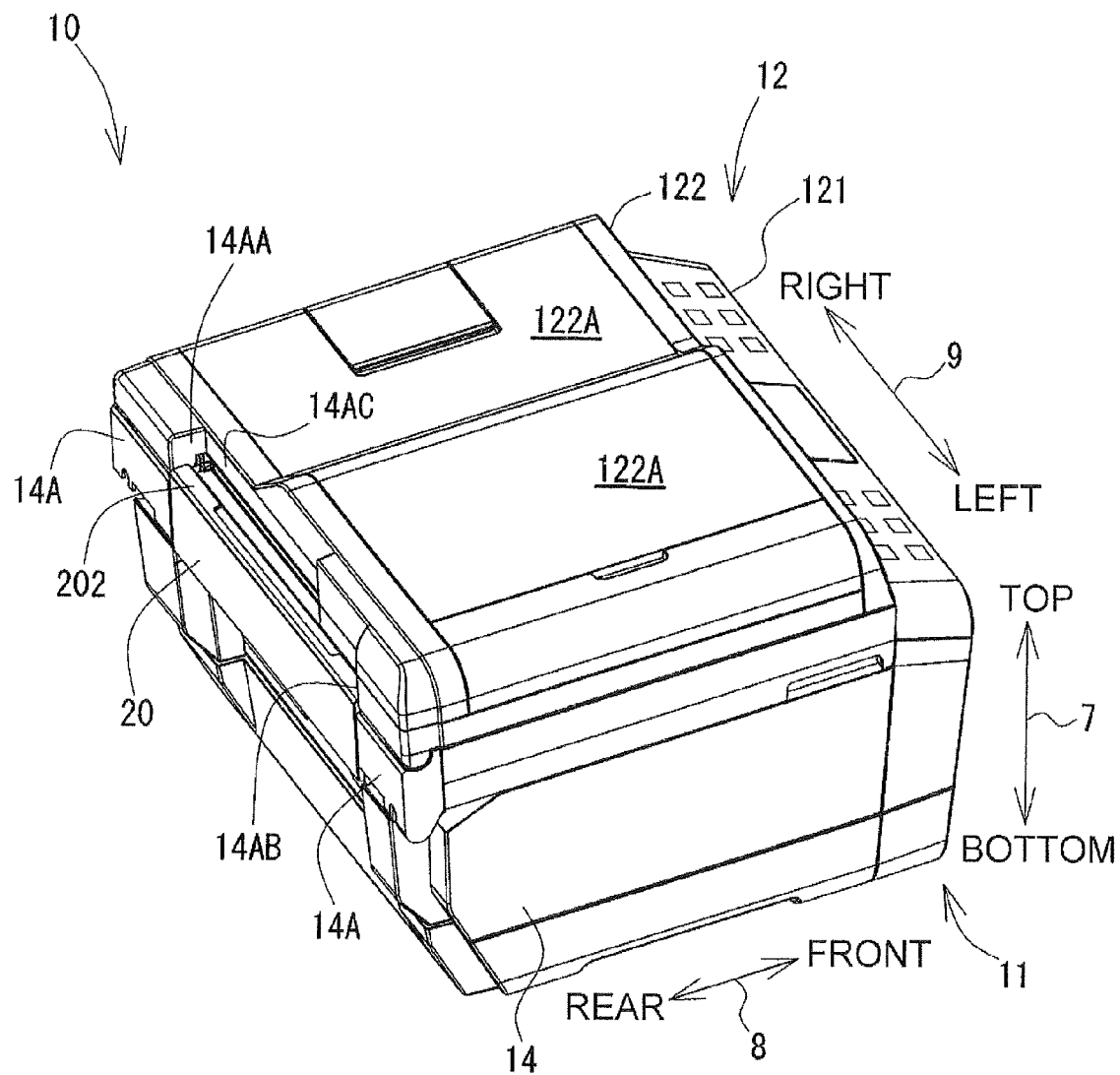
FIG. 1 is a perspective view illustrating the appearance of an image forming apparatus as an example according to an embodiment of the invention while a manual paper feed tray is in a first position.

FIG. 1 is a perspective view illustrating a multifunctional apparatus 10 as an example of an image recording apparatus. In the following description, a vertical direction 7 is defined on the basis of a state in which the multifunctional apparatus 10 is installed so as to be useable (a state in FIG. 1), and a longitudinal direction 8 is defined on the basis that a side on which an operation panel 121 is provided is a foreside (front side), and a lateral direction 9 is defined on the basis of viewing the multifunctional apparatus 10 from the foreside (front side).

The multifunctional apparatus 10 may generally be formed into a thin rectangular-parallelepiped shape in which the width (length in the lateral direction 9) and the depth (length in the longitudinal direction 8) are larger than the height (length in the vertical direction 7). An image scanner 12 (an example of "image reading device") is disposed on the upper portion of the multifunctional apparatus 10, and an ink jet printer 11 (an example of "printing device") is disposed on the lower portion of the multifunctional apparatus 10. The multifunctional apparatus 10 has various functions including a facsimile function, a printer function, a scanner function, and a copy function. In one embodiment, the multifunctional apparatus 10 may have a single-sided or double-sided image recording function.

[Configuration of the Image Scanner 12]

The image scanner 12 is disposed on the upper portion of the printer 11 and includes the operation panel 121 disposed on an anterior portion of an upper surface of the apparatus and a scanner 122 that reads an image recorded on a document. The scanner 122 is pivotally disposed via a first connecting member P1 which pivotally connects a rear end portion of the scanner 122 and a rear end portion of the casing 14. The first connecting member P1 includes two hinge members 122C, for example, which are disposed on a right side and a left side, respectively, of the multifunctional apparatus 10. The scanner 122 has a depressed portion 122B in the rear end portion. A manual paper feed tray 20, which will be described below, is disposed between the two hinge members 122C. A document is fed from the manual paper feed tray 20 into a first transport roller 60 and a pinch roller 61, which will be hereinafter described. As one example, the manual paper feed tray 20 is mounted on the scanner 122 and is integrally pivotable with the opening/closing of the scanner 122. Furthermore, the manual paper feed tray 20 is also independently openable/closable with respect to the scanner 122. For example, a rotation shaft of the manual paper feed tray 20 is coaxial with a rotation axis of the scanner 122. A storage space (see, FIG. 9) to store the manual paper feed tray 20 is formed in the rear end portion of the scanner 122 by the depressed portion 122B.

The operation panel 121 may be used for operating the printer 11 and the scanner 122 and may be disposed on an anterior portion of the upper surface of the multifunctional apparatus 10 so as to be positioned in front of the scanner 122. The operation panel 121 includes various operation buttons and a liquid crystal display. Users input instructions using the operation panel 121 to operate the multifunctional apparatus 10. For example, the various operation buttons include: mode selection buttons such as a start button used for initiating operation of the printer 11 and the scanner 122, a stop button used for stopping such operation and finishing a setting operation, a facsimile button used for selecting a facsimile function, a scanner button used for selecting a scanner function, and a copy button used for selecting a copy function; a dial button used for inputting a copy number and/or scanning resolution of the scanner 122; and a plurality of input keys that may act as various setup buttons.

Although, in some configurations, the scanner 122 is configured as a flat bed scanner (FBS) and an automatic document feeder (ADF), the scanner 122 according to an aspect of the disclosure may have other suitable configurations in so far as an image recorded on a document is scanned. Therefore, such a configuration is not described herein in detail.

[Configuration of the Printer 11]

The printer 11 has a casing (housing) 14 in which an opening is formed on the front side and the back side. Each component of the printer 11 is disposed inside the casing 14.

A cavity is formed so as to extend from the front opening (not illustrated) of the printer 11 to the inside of the casing 14. A paper feed cassette 78 (see, FIG. 4) is provided in the cavity. The paper feed cassette 78 is not illustrated in FIGS. 1 to 3. The paper feed cassette 78 is configured so as to be removably inserted from the front opening to the inside of the casing 14 in the longitudinal direction 8. The paper feed cassette 78 can hold various sizes of recording paper (e.g., a sheet). Although the multifunctional apparatus 10 is described with only one paper feed cassette 78 in the present embodiment, the multifunctional apparatus 10 may be configured so as to be capable of accepting a plurality of the paper feed cassettes 78. For example, the multifunctional apparatus 10 may have a first paper feed cassette and a second paper feed cassette that is capable of sliding above the first paper feed cassette in the longitudinal direction 8.

Figure 2:
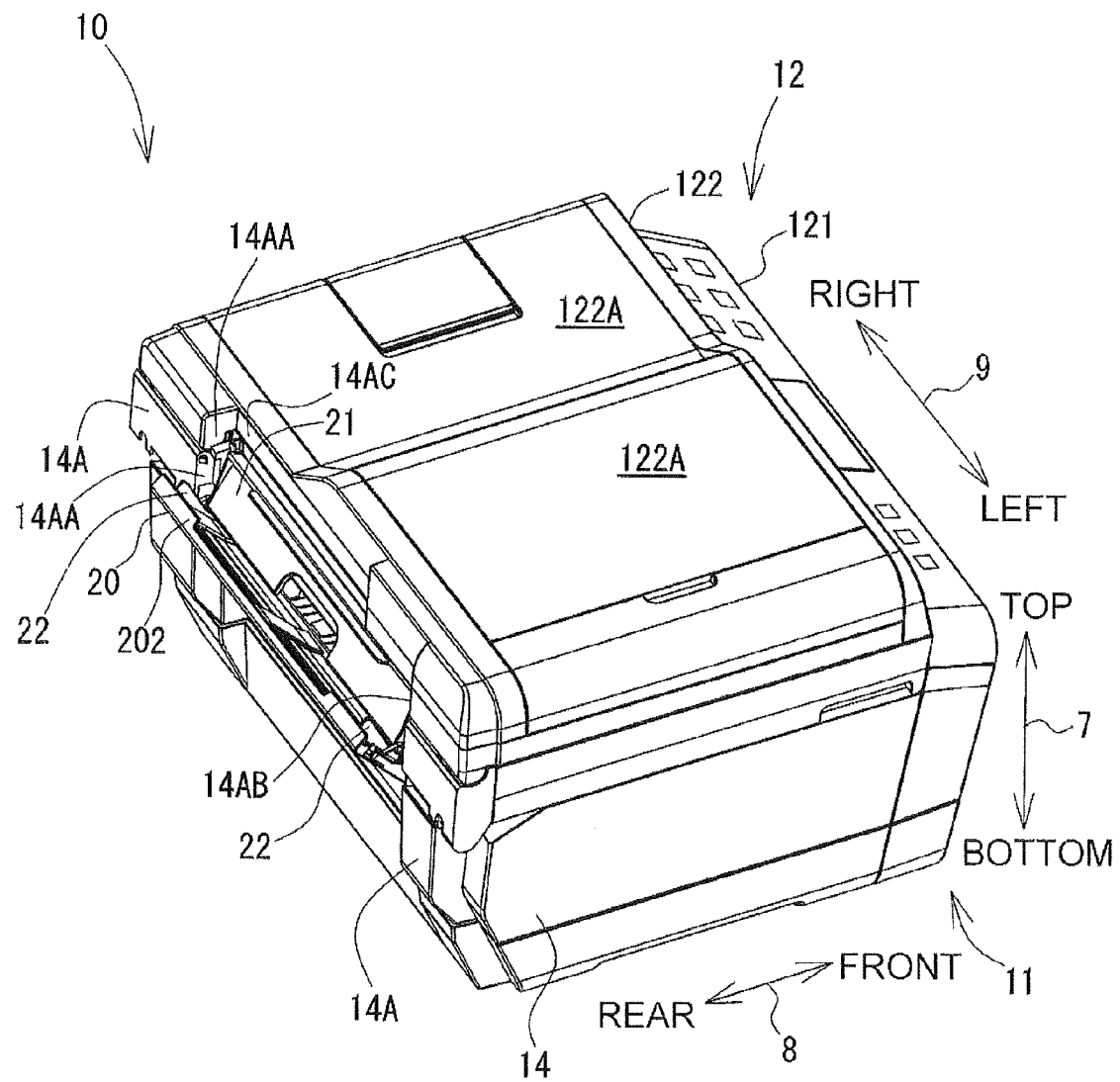
FIG. 2 is a perspective view illustrating the appearance of the image forming apparatus as the example according to the embodiment of the invention while the manual paper feed tray is in a second position.

A depressed portion is formed on a back side 14A of the printer 11. With reference to FIGS. 2 and 4, the depressed portion is formed at a height between the scanner 122 and the paper feed cassette 78 and includes a right side 14AA, a left side 14AB, and a recessed surface 14AC. With reference to FIG. 4, the opening (hereinafter referred to as a back side opening 13) formed on the back side of the printer 11 is disposed at or towards a lower or bottom portion of the recessed surface 14AC of the depressed portion.

Figure 3A:
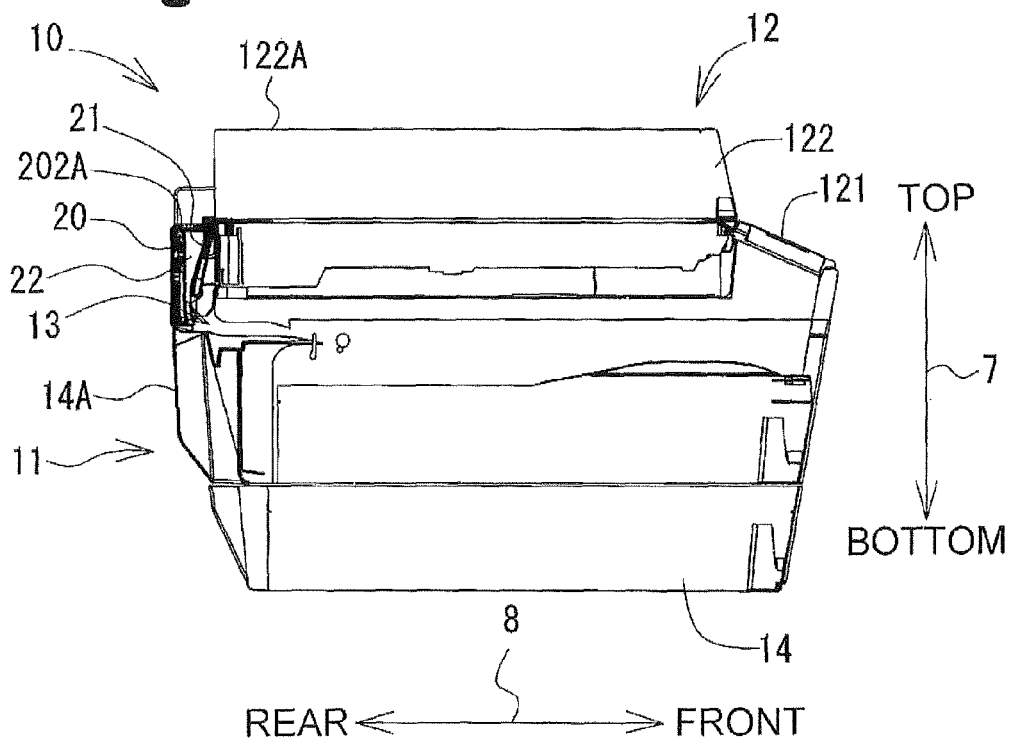
FIG. 3A is a left side view illustrating the image forming apparatus as the example according to the embodiment of the invention while the manual paper feed tray is in the first position.
Figure 3B:
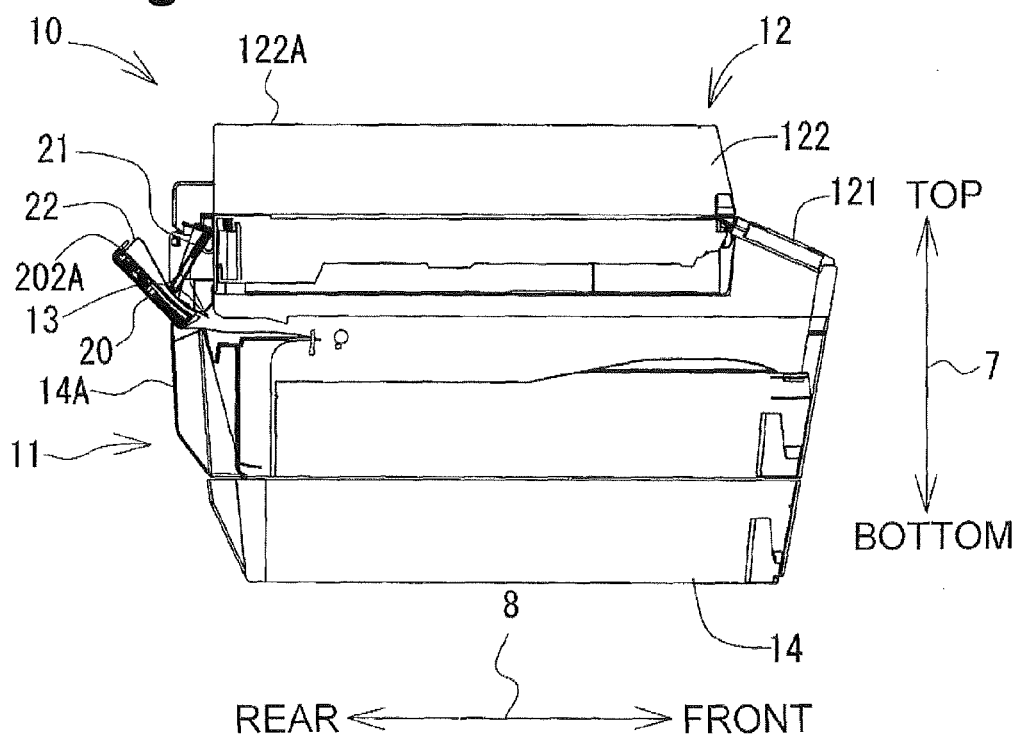
FIG. 3B is a left side view illustrating the image forming apparatus as the example according to the embodiment of the invention while the manual paper feed tray is in the second position.

With reference to FIGS. 1 to 3, a manual paper feed tray 20 (an example of "feed tray") is openably disposed on the depressed portion. For example, paper feed tray 20 may pivot about a rotation shaft 201A. FIGS. 1 and 3A illustrate the closed manual paper feed tray 20. FIGS. 2 and 3B illustrate the opened manual paper feed tray 20. Recording paper of various sizes can be placed on the opened manual paper feed tray 20. A configuration of the manual paper feed tray 20 will be described hereinafter.

Subsequently, a configuration of the printer 11 will be described in further detail with reference to FIG. 4. In FIG. 4, illustration of the front side of the paper feed cassette 78 is omitted (right side in FIG. 4). The printer 11 includes, in addition to the paper feed cassette 78, a feeding section 15 that picks up recording paper on the paper feed cassette 78 to feed (transport) the paper and includes an ink jet recording section 24 (e.g., a recording portion) that ejects ink droplets onto the recording paper fed by the feeding section 15 to form an image on the recording paper. Such components are provided inside the casing 14. The recording section 24 is not limited to an ink jet type, and an electrophotographic printing technique or a thermosensitive recording technique can be employed.

[Transport Path 65]

In the printer 11, a transport path 65 is formed from the paper feed cassette 78 and the manual paper feed tray 20 to an ejected-paper holding section 79 through the recording section 24. The transport path 65 is sectionalized into: a curved path 65A formed between the leading end (rear end) of the paper feed cassette 78 and the recording section 24; a transport path 65B formed between the leading end (forward end) of the manual paper feed tray 20 and a junction 36 where the curved path 65A and the transport path 65B meet; and a paper ejection path 65C formed between the recording section 24 and the ejected-paper holding section 79. The ejected-paper holding section 79 may be configured so as to be integrated with the paper feed cassette 78 or so as to be fixed to a frame or the like of the printer 11.

Figure 9:
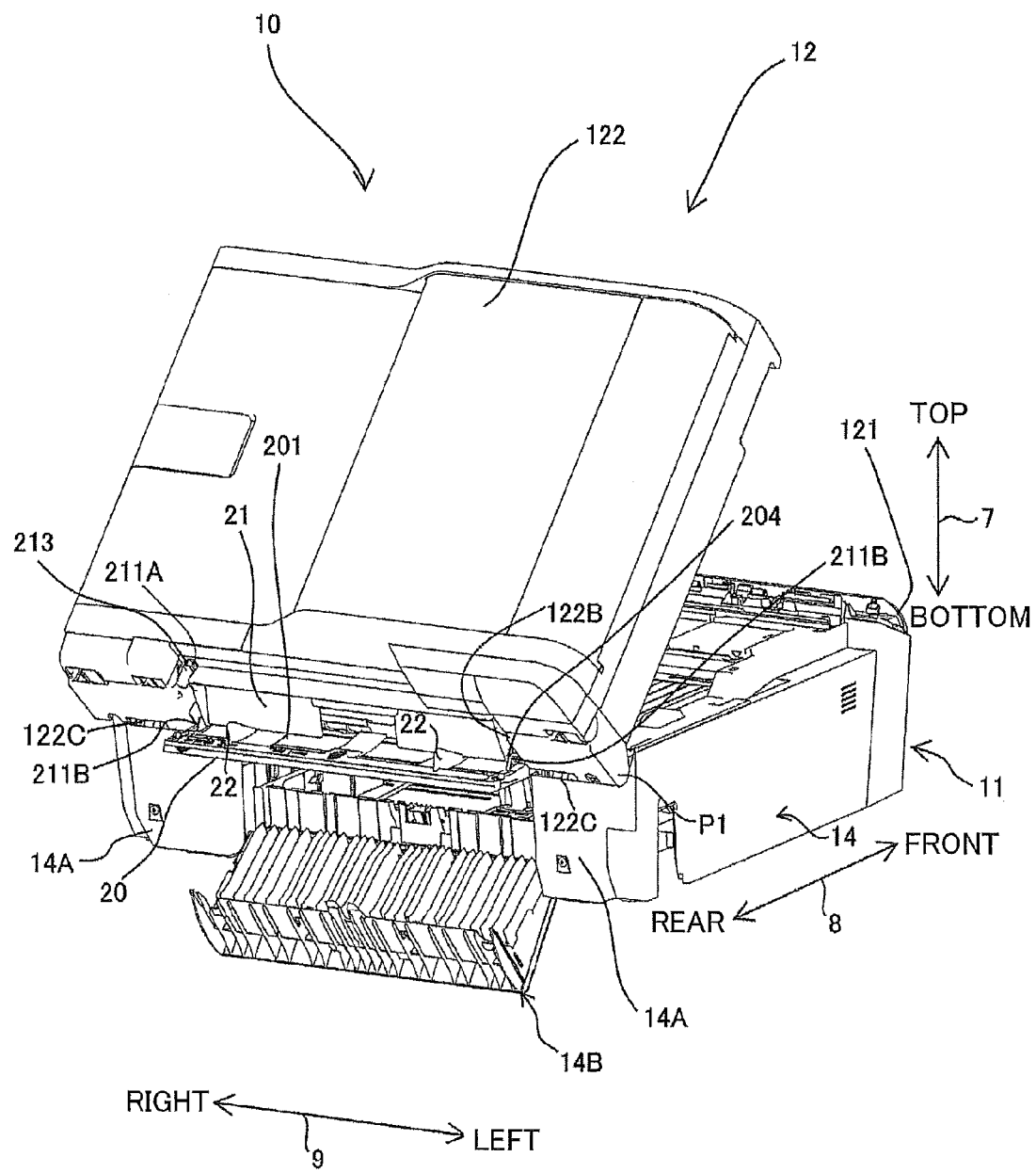
FIG. 9 is a perspective view illustrating the appearance of the image forming apparatus as the example according to the embodiment of the invention while the image scanner is opened and the manual paper feed tray is opened.

As illustrated in FIG. 4, the curved path 65A extends in a curved shape from the vicinity of the upper end of an inclined separation plate 22 included in the paper feed cassette 78 to the recording section 24. Recording paper is backward transported from the paper feed cassette 78. The recording paper is moved through a U-shape from the lower side to upper side of the multifunctional apparatus 10 through the curved path 65A at a posterior portion of the apparatus. Then, the recording paper is forward transported. The curved path 65A is defined by an exterior guide member 18 and an interior guide member 19 which are spaced apart with a predetermined gap therebetween so as to face each other. The exterior guide member 18, the interior guide member 19, and a first lower-side guide member 80, first upper-side guide member 81, second upper-side guide member 82, second lower-side guide member 83, and third upper-side guide member 84 which will be hereinafter described all extend in a vertical direction (the lateral direction 9 in FIG. 1) with respect to FIG. 4. A rear cover 14B and the exterior guide member 18 are integrally openable/closable as illustrated in FIG. 9.

The transport path 65B linearly extends from the back side opening 13 of the printer 11 to the junction 36 where the curved path 65A and the transport path 65B meet. Recording paper is inserted from the back side opening 13 toward an interior or front end of apparatus 10 by users of the multifunctional apparatus 10 while being supported by the manual paper feed tray 20. The recording paper is inserted into a nip 60A between a first transport roller 60 and a pinch roller 61 (an example of "feeder") through the transport path 65B.

The transport path 65B is defined by the first lower-side guide member 80 and the first upper-side guide member 81 which are spaced apart with a predetermined gap therebetween so as to face each other. The second upper-side guide member 82 is disposed on a downstream side of the first upper-side guide member 81 with respect to a transport direction (hereinafter referred to as a "downstream side", simply). The term "transport direction" means a direction in which recording paper is transported through the transport path 65 (a direction indicated by a chain double-dashed arrow in FIG. 4). The second upper-side guide member 82 extends so as to be positioned between the leading end (forward end) of the first upper-side guide member 81 and the vicinity of the upper-side of the junction 36 and guides the recording paper inserted from the manual paper feed tray 20 to the nip 60A through the junction 36. In the embodiment, although the first lower-side guide member 80 and the exterior guide member 18 are separately formed, both may be integrally formed in other embodiments or arrangements. In addition, although the first upper-side guide member 81 and the second upper-side guide member 82 are separately formed, both may be integrally formed in some arrangements.

The paper ejection path 65C is defined by the second lower-side guide member 83 and the third upper-side guide member 84 which are disposed on the downstream side relative to the recording section 24. In the paper ejection path 65C, a second transport roller 62 supports the under surface of the image-recorded recording paper and guides the paper to the downstream side. The third upper-side guide member 84 is disposed above the second lower-side guide member 83. The third upper-side guide member 84 and the second lower-side guide member 83 are disposed so as to face each other while being spaced apart with a predetermined gap therebetween through which the recording paper can be transported.

[Recording Section 24]

With reference to FIG. 4, the recording section 24 is disposed above the paper feed cassette 78. The recording section 24 is configured so as to be reciprocated along a guide rail (not illustrated) extending in a vertical direction with respect to FIG. 4 (main scanning direction). Platen 42 is disposed below the recording section 24. The platen 42 horizontally supports the recording paper while an image is recorded on the paper by the recording section 24. The recording section 24 ejects ink in the form of fine ink droplets from a nozzle 39 onto the recording paper transported on the platen 42 during reciprocation of the recording section 24 in a main scanning direction, the ink being supplied from an ink cartridge (not illustrated). Consequently, an image is recorded on the recording paper.

The first transport roller 60 and the pinch roller 61 are disposed between the posterior end of the curved path 65A and the recording section 24. Such rollers form a pair such that the pinch roller 61 is disposed below the first transport roller 60 and contacts a surface of the first transport roller 60 by being urged thereon with a biasing member (not illustrated) such as a spring. The first transport roller 60 and the pinch roller 61 pinch the recording paper transported through the curved path 65A and the transport path 65B to transport the paper onto the platen 42.

The second transport roller 62 and a toothed roller 63 are disposed between the recording section 24 and the beginning of the paper ejection path 65C. Such rollers form a pair such that the toothed roller 63 is disposed above the second transport roller 62 and contacts a surface of the second transport roller 62 by being urged thereon by its own weight or a spring. The second transport roller 62 and the toothed roller 63 pinch the recording paper on which recording has been performed and then further transport the paper to a downstream side (toward the ejected-paper holding section 79).

The first transport roller 60 and the second transport roller 62 rotate by receiving a rotational driving force from a transport motor (not illustrated) through a driving force transmission mechanism. The first transport roller 60 and the second transport roller 62 are intermittently driven during image recording. Accordingly, the recording paper is subjected to image recording while being transported in accordance with a predetermined pitch.

[Feeding Section 15]

The feeding section 15 serves to transport recording paper held in the paper feed cassette 78 to the curved path 65A and includes a paper feed roller 25, a paper feed arm 26, and a driving force transmission mechanism 27. The paper feed roller 25 is disposed above the paper feed cassette 78. The paper feed roller 25 serves to pick up recording paper held in the paper feed cassette 78 to transport the paper to the curved path 65A and is rotatably supported by the paper feed arm 26 at an end thereof. The paper feed roller 25 is rotationally driven by receiving the rotational force of a paper feed motor (not illustrated) through the driving force transmission mechanism 27. The driving force transmission mechanism 27 is supported by the paper feed arm 26 and includes a plurality of gears that are linearly arranged substantially in parallel with a direction in which the paper feed arm 26 extends. The paper feed roller 25 is capable of rotating about a shaft 28 as a central rotational shaft to contact an upper surface of the recording paper held in the paper feed cassette 78 by being pressured thereon.

[Registration Sensor 110]

With reference to FIG. 4, a registration sensor 110 is disposed in the curved path 65A, the sensor 110 detecting a position of the leading end of the recording paper transported through the curved path 65A or inserted from the manual paper feed tray 20 through the transport path 65B. For example, the registration sensor 110 includes a rotating body having detectors 112A and 112B and includes an optical sensor 111, such as a photointerrupter, having a light emitting device (light emitting diode, for example) and a light receiving device (phototransistor, for example) that receives light emitted from the light emitting device. The rotating body is disposed so as to be able to rotate about a shaft 113. The detector 112A protrudes from the shaft 113 so as to approach the curved path 65A relative to a position of the exterior guide member 18. The detector 112B intrudes in an optical path between the light emitting device and the light receiving device of the optical sensor 111 while external force is not applied to the rotating body, and blocks the light passing the optical path.

[Manual Paper Feed Tray 20]

With reference to FIGS. 2, 4, 5, and 6, the manual paper feed tray 20 is provided in the rear of the recessed surface 14AC. A sheet of recording paper of various sizes, such as A4-size paper, is capable of being mounted on the manual paper feed tray 20.

Figure 5:
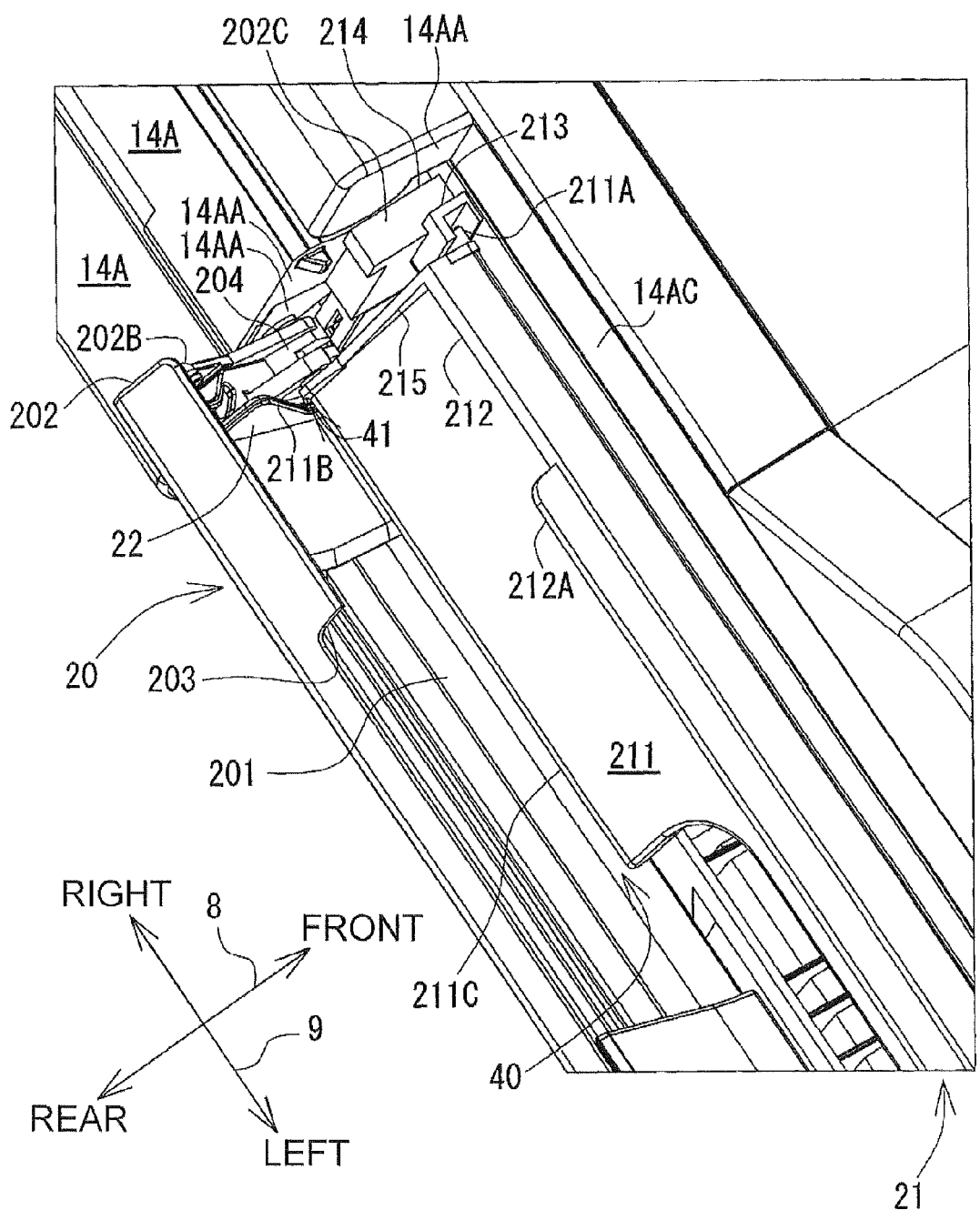
FIG. 5 is a perspective view illustrating the manual paper feed tray, a sheet guide, and a width adjustment guide.
Figure 6:
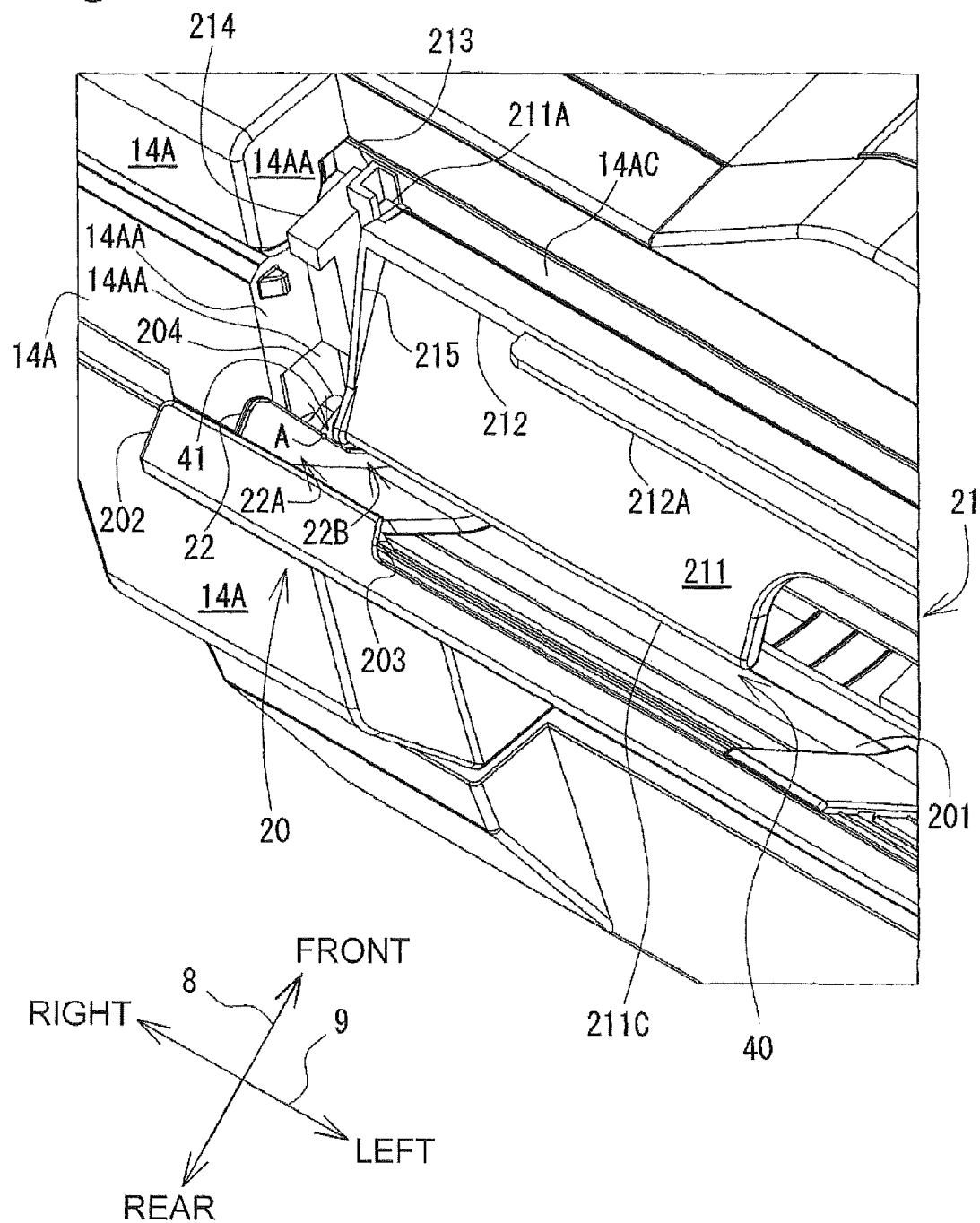
FIG. 6 is a perspective view illustrating the manual paper feed tray, the sheet guide, and the width adjustment guide.

With reference to FIGS. 5 and 6, the manual paper feed tray 20 has a mounting plate 201 on which the recording paper is mounted and has a lid plate 202 (e.g., a protruding portion) vertically formed at the leading end (upper end) of the mounting plate 201, the plate 202 extending in the lateral direction 9 with respect to a surface on which the recording paper is mounted. The lid plate 202 includes a depressed portion 203 having a shape corresponding to and/or matching a shape of a protrusion 212A of a lid panel 212 vertically formed at an upper end of a sheet guide 21 (e.g., a restriction plate) that will be described below. The manual paper feed tray 20 is configured in a substantially flat plate shape.

In FIGS. 5 and 6, each of the manual paper feed tray 20 and the sheet guide or restriction plate 21 is described only at the right side thereof, and the left side thereof is omitted. The manual paper feed tray 20, the sheet guide 21, and supporting mechanisms thereof have symmetric configuration. Accordingly, the right sides of the manual paper feed tray 20, the sheet guide 21, and the supporting mechanisms thereof will be mainly described in the following, and description of left sides thereof is omitted or described where appropriate.

A right rotating shaft (not illustrated) and a left rotating shaft 201A (see, FIG. 4) are provided at the base end (lower end) of the manual paper feed tray 20, the right rotating shaft extending in a right direction from the right side of the mounting plate 201, and the left rotating shaft 201A extending in a left direction from the left side of the mounting plate 201. The right rotating shaft is inserted into an opening formed on the right side 14AA at a position facing the right rotating shaft. The left rotating shaft 201A is inserted into an opening formed on the left side 14AB at a position facing the left rotating shaft. In other words, the manual paper feed tray 20 is supported by the right rotating shaft and the left rotating shaft 201A at the base end and is configured so as to be able to rotate about the right rotating shaft and the left rotating shaft 201A as the central axis of rotation.

On the basis of the above, the manual paper feed tray 20 can be rotated as indicated by a dashed arrow in FIG. 4. The manual paper feed tray 20 is rotated and therefore takes a closing position (indicated by a dashed line in FIG. 4) and an opening position (indicated by a full line in FIG. 4) with respect to the printer 11.

With reference to FIGS. 1 and 3A, the manual paper feed tray 20 in the first position rises in parallel with the back side 14A. A surface of the mounting plate 201 on which the recording paper is mounted faces the recessed surface 14AC. The lid plate 202 forms an upper surface of the manual paper feed tray 20. The lid plate 202 covers a gap between the manual paper feed tray 20 in the first position and the recessed surface 14AC. With reference to FIG. 3A, in cases where the manual paper feed tray 20 is in the first position, the upper end of the manual paper feed tray 20, namely an outer surface 202A of the lid plate 202, is located at a lower position than an upper surface 122A of the scanner 122, the surface 122A being the highest position of the multifunctional apparatus 10.

The manual paper feed tray 20 has a raised-state holding mechanism that holds the first position. For example, with reference to FIG. 5, protrusions 202B are disposed on the lid plate 202 at the two ends thereof in the lateral direction 9 on a side from which the recording paper is inserted. Each of the protrusions 202B is formed with a biasing member or the like having biasing force from the leading end of the mounting plate 201 to the base end. In cases where the manual paper feed tray 20 is in a first position, the protrusions 202B are pressed against a surface 202C facing the protrusion 202B. Accordingly, the manual paper feed tray 20 holds the first position unless force larger than the biasing force is applied to the manual paper feed tray 20. Such a mechanism is capable of being employed as the raised-state holding mechanism. Obviously, the holding mechanism is not limited to such a mechanism, and any mechanism may be applied in so far as the manual paper feed tray 20 can hold the first position.

With reference to FIGS. 2, 3B, 5, and 6, the manual paper feed tray 20 in the second position is inclined obliquely upward and outward from the rear of the back side 14A.

The manual paper feed tray 20 has an inclined-state holding mechanism that holds the second position. For example, a configuration is supposed, in which a supporting plate is disposed below the manual paper feed tray 20. In cases where the manual paper feed tray 20 is in the second position, such a supporting plate abuts on a rear surface of the mounting plate 201, the rear surface being behind a surface on which the recording paper is mounted. Accordingly, the manual paper feed tray 20 is supported. The inclined-state holding mechanism is not limited to such a mechanism, and any mechanism may be applied in so far as the manual paper feed tray 20 can hold the second position.

[Sheet Guide 21]

With reference to FIGS. 5 and 6, the sheet guide 21 is disposed between the manual paper feed tray 20 and the recessed surface 14AC. The sheet guide 21 has an abutting plate 211 on which the recording paper abuts, side plates 215 vertically formed at the two ends of the abutting plate 211 in the lateral direction 9, and the lid plate 212 vertically formed at the upper end of the abutting plate 211. The lid plate 212 includes the protrusion 212A having a shape corresponding to and/or matching a shape of the depressed portion 203. The sheet guide 21 is configured in a substantially flat plate shape.

The abutting plate 211 includes an upper right shaft 211A (e.g., a first engaging portion) and an upper left shaft (not illustrated) at the two upper ends thereof, the upper right shaft 211A extending rightward from the right side of the plate 211, and the upper left shaft extending leftward from the left side of the plate 211. The abutting plate 211 further includes a lower right shaft 211B (e.g., a second engaging portion) and a lower left shaft (not illustrated) at the two lower ends thereof, the lower right shaft 211B extending rightward from the right side of the plate 211, and the lower left shaft extending leftward from the left side of the plate 211.

A u-shaped rail groove 213 (e.g., a rail groove) is provided on the right side 14AA, the rail groove 213 extending in the vicinity of and/or proximate to the recessed surface 14AC in the vertical direction 7. In particular, a supporting member 214 disposed between the right side 14AA and the sheet guide 21 is provided with the rail groove 213. The upper right shaft 211A is inserted into the rail groove 213. Accordingly, the sheet guide 21 is supported by the rail groove 213 so as to be able to slide in the vertical direction 7.

Pivot supports 204 (e.g., a tray-side engaging portion) are vertically formed on the two ends of the mounting plate 201 of the manual paper feed tray 20 in the lateral direction 9 between the leading end (upper end) and the base end (lower end) (for example, intermediate portions between the leading end and the base end). An opening or a hole is formed in the lateral direction 9 on each of the pivot supports 204 at positions corresponding to the lower right shaft 211B and lower left shaft of the sheet guide 21. The lower right shaft 211B and the lower left shaft are individually inserted into the openings or holes formed on the pivotal supports 204. Namely, the sheet guide 21 is supported by the pivotal support 204 so as to be able to rotate about the lower right shaft 211B and the lower left shaft as the central shafts.

In cases where the manual paper feed tray 20 shifts from the second position to the first position, the manual paper feed tray 20 rotates about the right rotating shaft and the left rotating shaft 201A as the central rotating shafts. Then, the pivot support (or tray-side engaging portion) 204 moves forward. Accordingly, the sheet guide 21 rotates about the lower right shaft 211B and the lower left shaft as the central shafts, and the upper right shaft 211A of the sheet guide 21 slides upward in the rail groove 213, and the upper left shaft slide in a similar manner. Consequently, in cases where the manual paper feed tray 20 is in the first position, the sheet guide 21 takes a position (indicated by a dashed line in FIG. 4) in which the sheet guide 21 is raised between the manual paper feed tray 20 and the recessed surface 14AC in parallel with the back side 14A. A surface of the abutting plate 211 on which the recording paper abuts faces the mounting plate 201. The lid plates 212 and 202 are engaged with each other at the protrusion 212A and the depressed portion 203. Accordingly, the two lid plates 202 and 212 cover the gap between the manual paper feed tray 20 in the first position and the recessed surface 14AC.

The manual paper feed tray 20 in the first position and the sheet guide 21 in the third position are positioned so as to be spaced apart each other with a predetermined gap therebetween in the longitudinal direction 8. Consequently, the sheet guide 21 is prevented from abutting on a width adjustment guide 22 which is vertically formed on the mounting plate 201 and will be described hereinafter.

In cases where the manual paper feed tray 20 shifts from the first position to the second position, the manual paper feed tray 20 rotates about the right rotating shaft and the left rotating shaft 201A as the central rotating shafts. Then, the pivot support 204 backward moves. Accordingly, the sheet guide 21 rotates about the lower right shaft 211B and the lower left shaft as the central shafts, and the upper right shaft 211A of the sheet guide 21 slides downward in the rail groove 213, and the upper left shaft slides in a similar manner. Consequently, in cases where the manual paper feed tray 20 is in the second position, the sheet guide 21 takes a position (indicated by a full line in FIG. 4) in which the sheet guide 21 inclines from the recessed surface 14AC to the mounting plate 201. In this case, an angle (θ) between the manual paper feed tray 20 and the sheet guide 21 is configured to be less than or equal to 90 degrees.

As described above, the sheet guide 21 changes position in conjunction with the manual paper feed tray 20 so as to take the third position while the tray 20 is in the first position and so as to take the fourth position while the tray 20 is in the second position.

With reference to FIGS. 5 and 6, in cases where the sheet guide 21 is in the fourth position, a gap 40 into which the recording paper can be inserted is formed between an lower end 211C of the abutting plate 211 and the surface of the mounting plate 201 on which the recoding paper is mounted. The gap 40 is formed so as to have a height less than or equal to the maximum thickness of recording paper allowed to be inserted into the multifunctional apparatus 10. For example, in cases where the recording paper to be inserted into the multifunctional apparatus 10 has a maximum allowed thickness of 2 mm, the gap 40 is formed so as to have a height that is less than or equal to 2 mm or that is not exceeding a value which is obtained by adding a certain height to the height of 2 mm to allow for easier insertion of the recording paper.

[Width Adjustment Guide 22]

With reference to the illustrative embodiments of FIGS. 2, 3A, 3B, 5, and 6, in order to accommodate the width of the recording paper inserted into the multifunctional apparatus 10, a pair of width adjustment guides 22 are vertically formed on a surface of the mounting plate 201 on which the recording paper is mounted, the guide extending in parallel with a direction in which the recording paper is inserted.

With reference to FIG. 6, the width adjustment guide 22 includes a portion 22A that has a height greater than the height of gap 40 and includes a portion 22B that has a height less than the height of gap 40. The portion 22A may be positioned to the rear of the gap 40 (as defined by the orientation of the apparatus 10) in the second position where the manual feed paper tray 20 is inclined obliquely upward from a rear side of the apparatus 10, and the portion 22B being positioned in front portion 22A but behind gap 40.

The width adjustment guides 22 are supported on a surface of the mounting plate 201, on which the recording paper is mounted, so as to be able to slide in the lateral direction 9. In particular, the width adjustment guides 22 slide between a position corresponding to the maximum size of recording paper to be inserted into the multifunctional apparatus 10 and a position corresponding to the minimum size thereof.

In a state in which the pair of width adjustment guides 22 have slid to a position corresponding to the size of the recording paper mounted on the mounting plate 201, the width adjustment guides 22 abut on the two ends of the recording paper. In particular, a left side surface of the width adjustment guide 22 at a right side abuts on a right end of the recording paper, and a right side surface thereof at a left side abuts on a left end of the recording paper.

An example of a supporting mechanism of the width adjustment guides 22 may include: forming a rail groove (not illustrated) extending in a lateral direction 9 on a surface of the mounting substrate 201 on which the recording paper is mounted; and then sliding the width adjustment guides 22 along the rail groove. Furthermore, the below configuration can be added. Namely, rack gears extending in the lateral direction 9 are disposed in the rear of one width adjustment guide 22 and in front of the other width adjustment guide 22. A pinion gear is disposed between the two rack gears so as to mesh with the two rack gears. Accordingly, by virtue of the rack gears and the pinion gear, the pair of width adjustment guides 22 are each capable of reversely sliding in the lateral direction 9 in an equal distance. Obviously, the supporting mechanism is not limited to such a mechanism, and any mechanism may be applied in so far as the width adjustment guides 22 can slide in a lateral direction 9.

[Advantageous Effect of the Embodiments]

Because the upper end of the manual paper feed tray 20 in the first position is at a lower position relative to the top of the scanner 122, the manual paper feed tray 20 does not excessively protrude to the upper-side of the multifunctional apparatus 10. In cases where the recording paper to be inserted into the multifunctional apparatus 10 contacts with the manual paper feed tray 20 in the second position, the recording paper is guided to the inside of the multifunctional apparatus 10 along the manual paper feed tray 20. This reduces the amount of space needed for placement of the apparatus 10. For example, a surface with less depth may be required to use the multifunctional apparatus 10 having a manual paper feed tray 20 that does not extend over an upper-side of the multifunctional apparatus 10.

The paper feed tray 20 takes the first position while the tray 20 is not used. In cases where the manual paper feed tray 20 is in the first position, a gap is generated between the tray 20 and the recessed surface 14AC. Foreign objects may intrude into the multifunctional apparatus 10 from the gap. However, in the embodiment, the lid plate 202 of the manual paper feed tray 20 and the lid plate 212 of the sheet guide 21 cover the gap between the tray 20 in the first position and the recessed surface 14AC, so that the intrusion of foreign objects into the multifunctional apparatus 10 can be decreased.

In the manual paper feed tray 20 in the second position, the leading end of the recording paper is inserted between the tray 20 and the back side 14A, and then the leading end of the recording paper abuts on the sheet guide 21 to be guided to the mounting plate 201 along the inclination of the plate 201. Then, the leading end of the recording paper abuts on a mounting surface of the mounting plate 201, and subsequently the leading end is guided to the gap 40 between the manual paper feed tray 20 and the sheet guide 21 while abutting on the mounting surface, and then is further guided to the back side opening 13. This allows for a user to appropriately insert one or more recording sheets through the manual paper feed tray 20 without requiring the user to visual confirm alignment and correct placement.

In some arrangements, the size of the gap 40 between the sheet guide 21 in the fourth position and the manual paper feed tray 20 in the second position does not exceed the maximum thickness of the recording paper that may be inserted into the multifunctional apparatus 10. Accordingly, faulty insertion of the recording paper, which has a thickness being too large for the multifunctional apparatus 10, can be prevented.

The two ends of the recording paper abut on the pair of width adjustment guides 22, so that the recording paper is mounted on the manual paper feed tray 20 at a predetermined position (position in which the recording paper is appropriately inserted into the multifunctional apparatus 10).

[Modifications of Embodiments]

Figure 7:
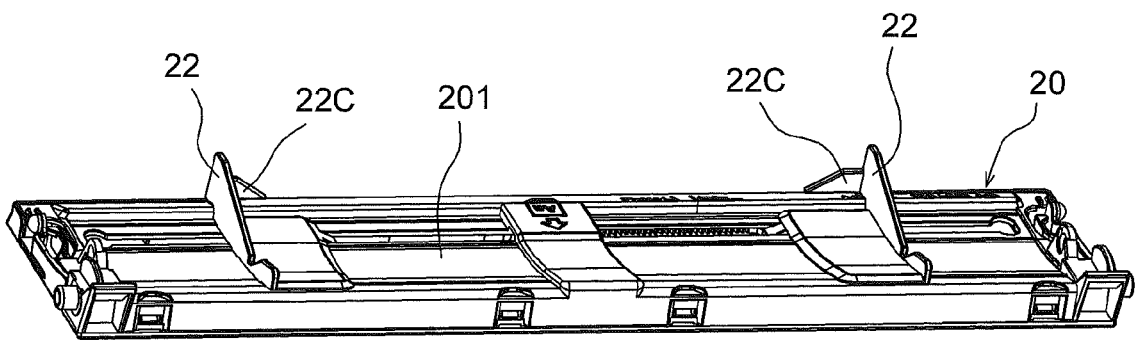
FIG. 7 is a perspective view illustrating an example of a manual paper feed tray and a pair of the width adjustment guides having protrusions which extend inward toward the other width adjustment guide.

With reference to FIG. 7, the width adjustment guides 22 may have a protruding portion (22C) which is positioned inside and between the pair of the guide plates. In this configuration where the recording paper is inserted into the manual paper feed tray 20, the recording paper contacts the protruding portion and is caused to be curved such that the central portion in the lateral direction 9 comes to be lower than the two ends. The curve enables the recording paper to be more inflexible. For example, the curvature of the recording paper may render the recording paper less susceptible to bending in a longitudinal direction. Accordingly, even if a posterior end of the recording paper protrudes from the tray, the posterior end of the recording paper is less likely to droop or bend (namely, bending of the recording paper (e.g., in the longitudinal direction) is reduced).

Furthermore, the width adjustment guides 22 may have a protrusion in the vicinity (at a point "A" in FIG. 6) of the sheet guide 21 in the fourth position on a side from which the recording paper is inserted, the protrusion being vertically formed on an upper surface of the guides 22. The protrusion is disposed so as not to abut on the sheet guide 21 in the third position.

For example, in cases where thin recording paper is mounted on the manual paper feed tray 20, the leading end of the recording paper may get over the width adjustment guides 22 to intrude into a gap 41 (see, FIGS. 5 and 6) between the guides 22 and the sheet guide 21. However, the protrusion bends a path through which the recording paper gets over the width adjustment guide 22 to intrude into the gap 41, and therefore such a problem is decreased.

Figure 8:
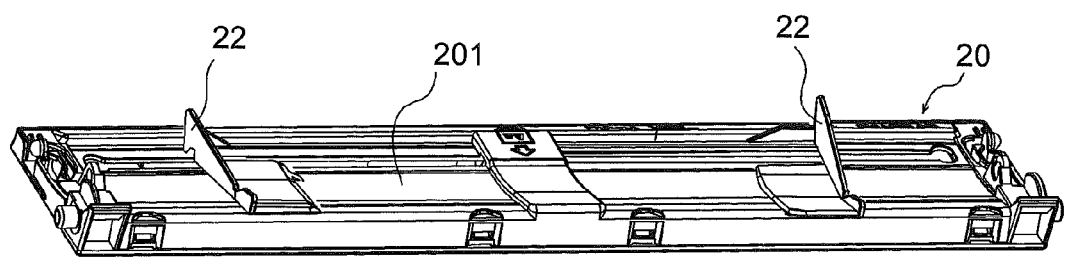
FIG. 8 is a perspective view illustrating an example of a manual paper feed tray and a pair of the width adjustment guides in which a distance between the pair of width adjustment guides increases in a tapering manner.

Furthermore, with reference to FIG. 8, a distance between the pair of width adjustment guides 22 may be increased at a posterior portion of the manual paper feed tray 20 in a tapering manner. In particular, the distance between the pair of width adjustment guides 22 is constant at an anterior portion of the manual paper feed tray 20 but is increased toward a posterior portion from a certain position. By virtue of such a configuration, the position in which the distance between the pair of width adjustment guides 22 is increased helps the recording paper to be guided between the width adjustment guides 22. Namely, the recording paper can be easily placed at an appropriate position.

Furthermore, a hole may be formed at the base end (lower end) of the manual paper feed tray 20. In cases where the manual paper feed tray 20 is in the second position, foreign objects may intrude into the multifunctional apparatus 10 from the back side opening 13. However, in cases where the hole is formed, foreign objects that fall toward the back side opening 13 fall to the rear of the back side 14A through the hole. Accordingly, the intrusion of foreign objects into the multifunctional apparatus 10 can be reduced.

In the embodiment, the rail groove is provided on the printer, but may be provided on the manual paper feed tray 20. In this case, the sheet guide 21 is rotatably supported by the printer (e.g., via pivot supports 204) and slides along the rail groove provided on the manual paper feed tray 20.

What is claimed is:

1. An image recording apparatus comprising:
   a printing device comprising a printing unit configured to record an image on a sheet;
   an image reading device disposed above the printing device and comprising a scanner configured to read an image recorded on a sheet;
   two hinge members configured to connect the image reading device and the printing device such that the image reading device is pivotable around a pivot axis with respect to the printing device; and
   a feed tray configured to receive placement of a sheet, disposed between the two hinge members, and having a pivot shaft interposed between the two hinge members, the feed tray being pivotable about the pivot shaft with respect to both the printing device and the image reading device, the pivot shaft being disposed coaxially with the pivot axis of the two hinge members,
   wherein the printing device comprises a feeder configured to feed the sheet placed on the feed tray into the printing unit.

2. The image recording apparatus according to claim 1, wherein the feed tray is mountable on the image reading device.

3. The image recording apparatus according to claim 1, wherein the feed tray is integrally pivotable with opening/closing of the image reading device.

4. The image recording apparatus according to claim 1, wherein the feed tray is configured to be independently pivotable with respect to the image reading device.

5. The image recording apparatus according to claim 1, wherein:
   the image reading device and the feed tray are configured to be integrally pivotable, with the feed tray closed, with respect to the printing device; and
   the image reading device and the feed tray are configured to be integrally pivotable, with the feed tray opened, with respect to the printing device.

6. The image recording apparatus according to claim 1, wherein the image reading device has a depressed portion between the two hinge members.

7. The image recording apparatus according to claim 6, wherein, when the feed tray is closed with respect to the image reading device, the feed tray is configured to be stored in the depressed portion.

8. The image recording apparatus according to claim 1, wherein, when the feed tray is closed with respect to the image reading device, a height of the feed tray does not exceed a height of the image recording apparatus and the feed tray closes a feed path from the feed tray into the image recording apparatus.

9. The image recording apparatus according to claim 1, further comprising an exterior cover disposed below the feed tray and configured to move between an opened position, in which a transport path, through which a sheet is fed from another tray different from the feed tray to the printing unit, is opened, and a closed position, in which the transport path is closed.

10. The image recording apparatus according to claim 9, wherein an interior facing portion of the exterior cover at least partially defines the transport path and an exterior side of the cover at least partially forms an exterior surface of the image recording apparatus.

11. An image recording apparatus comprising:
a printing device comprising a printing unit configured to record an image on a sheet;
an image reading device disposed above the printing device and comprising a scanner configured to read an image recorded on a sheet;
two hinge members configured to connect the image reading device and the printing device such that the image reading device is pivotable with respect to the printing device; and
a feed tray, configured to receive placement of a sheet, disposed between the two hinge members,
wherein the printing device comprises a feeder configured to feed the sheet placed on the feed tray into the printing unit,
wherein the feed tray includes a pivot shaft about which the feed tray is configured to pivot,
wherein the pivot shaft of the feed tray is interposed between the two hinge members, and
wherein the image reading device and the feed tray are configured to be independently pivotable about a same axis corresponding to the pivot shaft.

* * * * *